FIG. I.

INVENTORS:
Arnold L. Wilcox
Elliott J. Roberts
Elliott B. Fitch
BY
Arthur Middleton
ATTORNEY Oct. 31, 1950     A. L. WILCOX ET AL     2,528,099
METHOD AND APPARATUS FOR CONDUCTING
ION EXCHANGE OPERATIONS
Filed June 11, 1949     6 Sheets-Sheet 4

FIG. 4ª.

INVENTORS:
Arnold L. Wilcox
Elliott J. Roberts
Elliott B. Fitch

BY *Arthur Middleton*
ATTORNEY

Oct. 31, 1950

A. L. WILCOX ET AL
METHOD AND APPARATUS FOR CONDUCTING
ION EXCHANGE OPERATIONS 2,528,099

Filed June 11, 1949

INVENTORS:
Arnold L. Wilcox
Elliott J. Roberts
Elliott B. Fitch

BY
Arthur Middleton
ATTORNEY

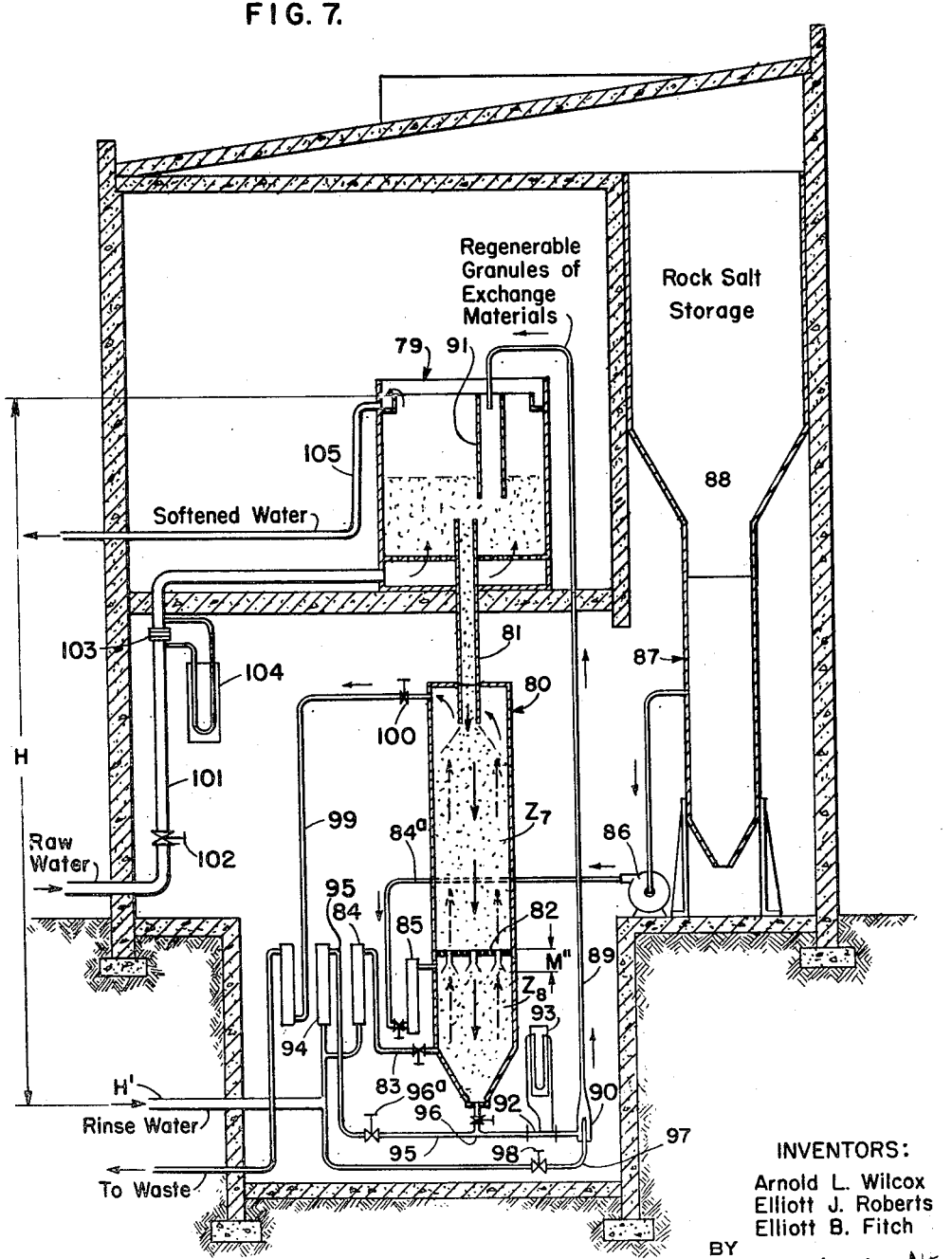

Patented Oct. 31, 1950

2,528,099

UNITED STATES PATENT OFFICE 2,528,099

METHOD AND APPARATUS FOR CONDUCTING ION EXCHANGE OPERATIONS

Arnold L. Wilcox, Elliott J. Roberts, and Elliott B. Fitch, Westport, Conn., assignors to The Dorr Company, Stamford, Conn., a corporation of Delaware Application June 11, 1949, Serial No. 98,448

8 Claims. (Cl. 210—24)

This invention relates to the treatment of solutions with granular ion exchange materials, whereby certain ions are to be removed from the solution in exchange for other ions imparted to it by the exchange materials—in other words, whereby the material upon contact with the solution releases into it certain ions while collecting others from the solution to the extent of the molar equivalent.

In this way one may treat a solution containing ionized solutes through ion exchange in order to replace objectionable ions in the solution with non-objectionable ones.

Such ion exchange operations are of a cyclic nature inasmuch as they require the exchange material to be regenerated after it has been exhausted, so that it may be reused. Therefore and, because of certain problems of operation as well as of economy, such ion exchange operations are usually carried out in intermittent fashion as a period of exhaustion of the exchange material alternates with a period of its regeneration.

Indeed an ion exchange operating cycle is herein contemplated which comprises contacting the material first with the solution to be treated until its exchange capacity is substantially exhausted, contacting the exhausted material with a regenerant solution until its exchange capacity is substantially restored, and then washing or rinsing the regenerated material free of residual regenerant solution whereupon the material may be re-subjected to contact with the solution which is to be treated. Thus a quantity or bed of the of the granular ion exchange material in the usual manner of operation yields a flow of treated liquid intermittently.

It is the main object of this invention to provide a method of operation and apparatus for conducting the operating cycle of such ion exchange processes in a continuous or non-intermittent manner, that is in a manner whereby treated liquid is obtainable in a continuous flow, that is a flow of treated liquid uninterrupted by periods of regeneration and of rinsing of the exchange material; and to obtain such continuity of flow in a reliable, efficient, as well as economical manner, and whereby the regenerant solution is effectively utilized and effectively contained in its zone and prevented from passing with the exchange material into the exhaustion zone.

For the purpose of this invention such ion exchange materials may be those which operate to exchange cations against cations, for example Na against Ca. This class of exchange materials may be termed the neutral cation exchange materials also known as zeolites which are widely used for water-softening where they remove Ca from the water in exchange for Na. These materials when exausted are regenerated with brine (NaCl) to restore their cation exchange capacity.

Another group of such ion exchange materials are those which operate in the so-called hydrogen ion exchange cycle in which they collect cations, that is positively charged ions such as Ca or Na or others from the solution being treated, while releasing into that solution H-ions which in the solution form with the anions (negatively charged ions) the corresponding acids. A solution containing ionized salts will by treatment with such a material become acidified to the extent that H-ion exchange has taken place. When their exchange capacity is exhausted these materials are regenerated with a suitable strength mineral acid such as $H_2SO_4$, to have their H-ion capacity restored. These materials may be termed acidic ion exchange materials or H-ion exchangers.

Still another group of known exchange materials are those which are acid-adsorbing and neutralizing or which may even be salt-splitting or alkalizing. Some such materials are said to operate in the hydroxyl cycle (OH-cycle) in which they are said to release OH-ions into an acid solution while collecting therefrom the molar equivalent of anions (negatively charged ions). These materials are known as anion exchangers or acid-adsorbing exchange materials. Others exchange the anions of salts for OH-ions directly and are therefore also known as strong anion exchange materials, since they are strong enough to split the salt molecule and to that extent to alkalize a solution.

Known H-ion exchangers as well as anion exchangers are of the synthetic resinous kind and are also known as organolites because of their organic nature which distinguishes them chemically from the zeolites which are inorganic in their constitution. An H-ion exchanger may be used in conjunction with an anion exchanger to remove ionized solutes or salts altogether from an aqueous solution. This removal from the solution of ionized salts is also known as de-ionization whereby the solution is contacted sequentially with an H-ion exchanger and with an anion exchanger to the end of producing what may be called the equivalent of distilled water. The chemical mechanism of deionization as such is today well-known and requires here no further explanation.

Both water-softening as well as de-ionization may employ the operating cycle which comprises the steps above outlined so that this invention may be said to relate to or to be applicable to both these purposes, namely water-softening as well as de-ionization. That is to say, the operating cycles in the respective instances differ substantially only in the kind of regenerating solution used which in the case of water-softening is brine, and in the case of de-ionization is an acid for the H-ion exchange treatment phase and an alkali for the acid removal (anion exchange) treatment phase.

However, for the purpose of illustration and in no limiting sense, this invention is herein exemplified in, and shown to be applied to the instance of water-softening.

The object stated above of producing a continuity of flow of ion exchange treated liquid is attained by moving a quantity of granular exchange material continuously through a sequence of treatment zones, namely through an exhaustion zone where the exchange material is contacted with the liquid to be treated, through a regeneration zone where the material is contacted with the regenerant solution, and through a rinsing zone where residual regenerant solution is washed from the material prior to its being passed on again to the exhaustion zone. In other words, as this exchange material keeps moving in a continuous manner downwardly through these zones and from one zone to the next in a cycle, there is being simultaneously passed through each of these zones the respective exhausting or conditioning liquid.

A particular difficulty in rendering continuous the intermittent exchange operation, has been to contain the regenerant solution within its zone, that is to prevent regenerant chemical which is specifically heavy as compared with rinse water applied, from leaking or escaping with the regenerated and rinsed exchange material into the exhausting or water-softening zone where obviously such chemical even in small quantities, in this instance brine, is objectionable.

In operating what we shall call a regenerant tower through which the exhausted exchange material is moved downwardly first through a superjacent regeneration zone and then through a subjacent rinsing zone, we have passed rinse water upwardly through both zones, that is we have passed water upwardly through the rinsing zone at the bottom and have continued the flow of spent rinse water, that is rinse water containing washed-out brine in great dilution herein termed the dilute brine, upwardly into and through the superjacent regeneration zone whence spent brine is allowed to overflow. To this upward flow of dilute brine rising into the regeneration zone, we have added fresh strong regenerant brine thus utilizing the dilute brine by raising its strength to that of fresh regenerant solution at its entry into the regeneration zone. In following out this principle of counter-current rinsing and regeneration as well as rinse water (dilute brine) utilization, we have encountered a critical problem of operation, namely that of downward salt leakage. That is, we were confronted with the phenomenon of undue and objectionable escape of relatively strong and, therefore, relatively heavy brine downwardly through the rinsing zone so that a portion of regenerant brine would escape together with the exchange material discharging as regenerated and rinsed exchange material from the bottom of the rinsing zone whence it was to be transferred to the exhaustion or water-softening zone. Due to such leakage some of the brine ultimately finds its way into the water-softening where its presence is highly undesirable.

According to this invention, in order to overcome this critical difficulty of downward brine leakage, a zone is provided for mixing fresh brine with weak brine (that is spent rinse water), such a mixing zone being functionally interposed between the rinsing zone and the regeneration zone. To be effective for the purpose of this invention, namely to contain the strong brine above in its zone above the rinsing zone, this additional mixing zone must be kept substantially free from bulk exchange material.

According to one feature this interposed mixing zone is established within the regeneration tower by interposing between the rinsing zone and the regeneration zone a two-way permeable partition. Such a two-way permeable partition in the sense of this invention allows liquid to pass therethrough upwardly along one path into the strong brine zone, while allowing regenerated exchange material to pass therethrough downwardly along another path into the weak brine zone.

More specifically, this two-way permeable partition is in the nature of a construction plate having perforations small enough to support the exchange material of the regeneration zone or strong-brine zone above, while allowing upward passage therethrough of liquid from the rinsing or weak-brine zone into the regeneration or strong-brine zone. However, this two-way partition or constriction plate also has downwardly directed spouts herein termed the down-spouts permitting the downward passage therethrough and through the plate of regenerated exchange material from the upper into the lower zone under conditions whereby any substantial transfer of brine into the rinsing zone is prevented without requiring an unduly large upflow volume of rinse water.

According to another feature the mixing zone for the strong and the weak brine is disposed outside of the regeneration tower or else separate from the rinse- as well as from the regeneration zone. That is to say, the weak brine is withdrawn from underneath a partition disposed between the rinsing and the regeneration zone, which partition, however, provides down-spouts for the downward passage therethrough of regenerated exchange material into the rinsing zone. The weak brine thus withdrawn is mixed outside the tower with strong brine to constitute fresh regenerant solution which is then forced or pumped back into the regeneration zone and upwardly therethrough in order that as spent brine it may overflow from the top of the regeneration zone, that is from the top end portion of the tower.

Still other features relate to means for hydraulically controlling the rate of throughput of exchange material through the regeneration tower, namely by introducing into the transfer conduit leading from the tower to the softening tank carrier water (herein also termed control water) at a controlled rate and pressure.

According to one embodiment, the continuous operating cycle, that is the cyclic movement of the exchange material is completed by discharging the regenerated and rinsed exchange material from the bottom of the rinsing zone, that is from the bottom of the tower at a controlled rate continuously into a tank in which water-softening takes place. This tank, herein also termed the softening tank, represents the exhaustion zone for the exchange material. Raw water flowing upwardly through this softening tank overflows from the top thereof as softened water, while the exchange material fed to the top of the tank gravitates to the bottom in somewhat of a teeter condition in the process of getting exhausted while softening. Exhausted exchange material is withdrawn or ejected from the bottom of the softening tank and is fed along with carrier water to a top compartment of the tower representing a reservoir for exhausted exchange material above the regeneration zone. Any exchange material excessively fed from the softening zone to this reservoir may overflow therefrom along with carrier water and gravitate back into the softening tank. The quantity of exchange material needed for maintaining the cycle in continuous operation gravitates from the reservoir through a constriction or down-spout into the regeneration zone below at the controlled rate at which regenerated and rinsed material is being continuously withdrawn from the bottom of the rinsing zone or of the tower for re-use in the softening tank.

According to another embodiment, the softening tank or exhaustion zone is disposed above the regeneration tower and has direct hydraulic communication therewith. That is to say, exhausted exchange material in a slurry gravitates from the softening tank through a conduit directly to and into the otherwise closed top portion of a regeneration tower, while rinsed and regenerated exchange material is being released from the bottom of the tower and returned to the softening tank with carrier water by suitably controlled hydraulic lifting means. Except for the absence of an extra reservoir at the top of the regeneration tower this embodiment is similar in operation and features to that of the preceding embodiment. That is to say, it contains a regeneration zone above and a rinsing zone beneath a two-way partition as well as an interposed mixing zone underneath that partition. The two-way partition provides for passage upwardly of regenerant solution along one path and for passage downwardly of exchange material along another path.

Whereas the invention is herein represented by apparatus involving the repetitious cycling of the exchange material through the exhaustion zone, the regeneration zone, and the rinsing zone, with the mixing zone functionally interposed between the regeneration- and the rinsing zone, the invention nevertheless is also represented in a sub-combination which comprises all but the exhaustion zone. This sub-combination presents the invention as a method and apparatus for carrying out ion exchange reactions.

Other features and advantages will appear as this specification proceeds.

Figure 4:
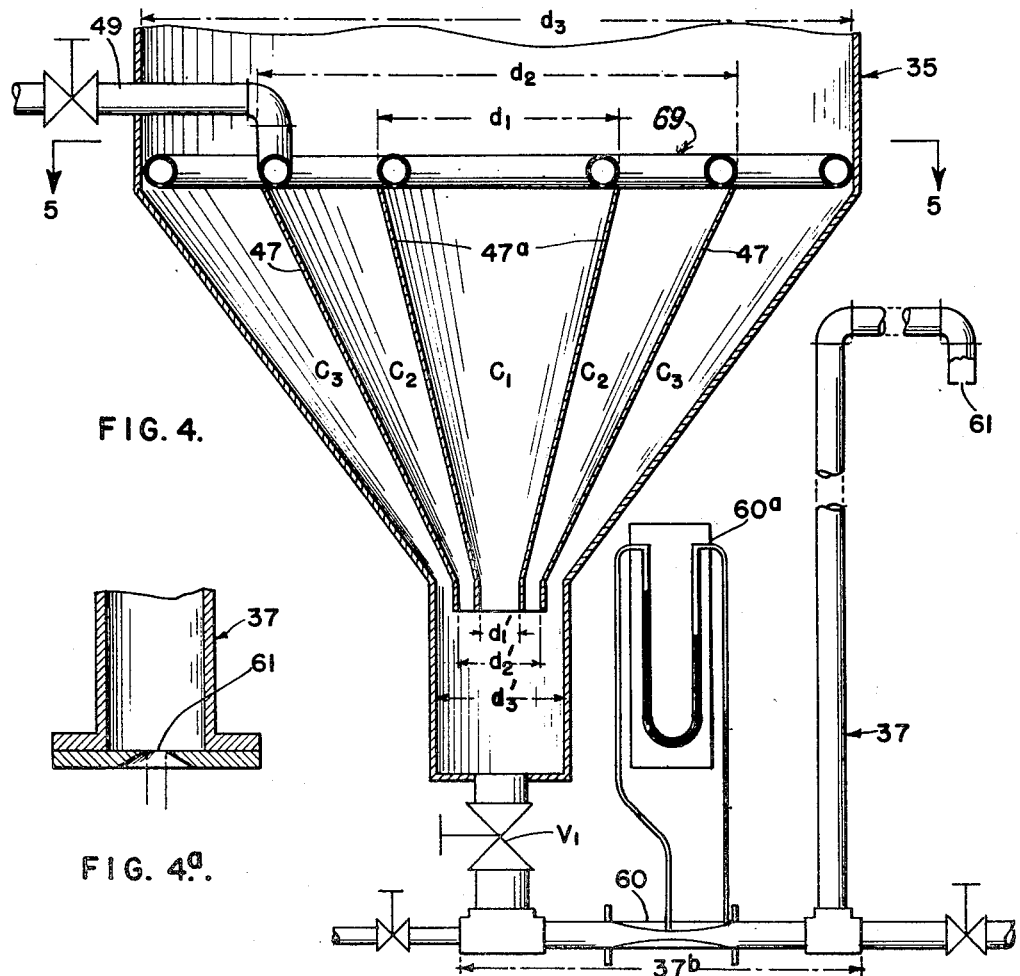
Fig. 4 is a further enlarged view of the bottom end portion of the regeneration tower featuring an arrangement of concentrically disposed conical discharge baffles for the exchange material.

Fig. 4ª shows an enlarged detail of the constricted discharge end portion of the transfer pipe for regenerated exchange material leading from the bottom of the regeneration tower to the top of the softening tank.

Figure 5:
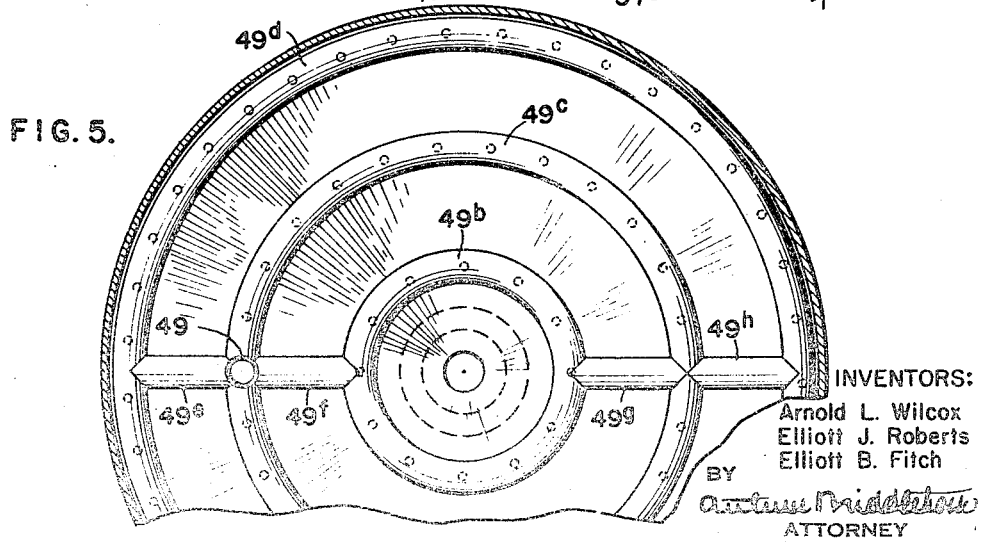

Fig. 5 is a plan view partly broken off, taken on the line 5—5 of Fig. 4, and showing the arrangement of a pipe system for introducing and distributing rinse water in the bottom end portion of the tower.

Figure 6:
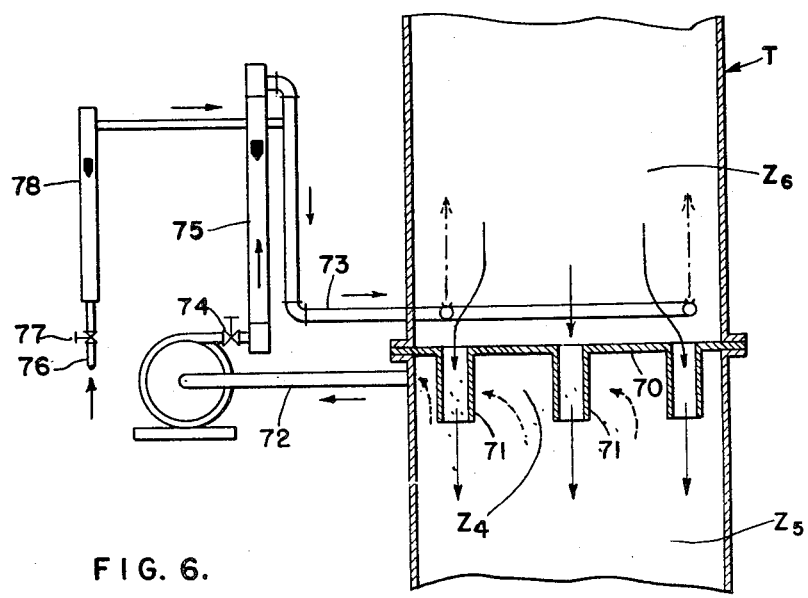

Fig. 6 is a diagrammatic view of a modified installation embodying this invention.

Fig. 7 is a modified arrangement of equipment involved in this invention.

Figure 1:
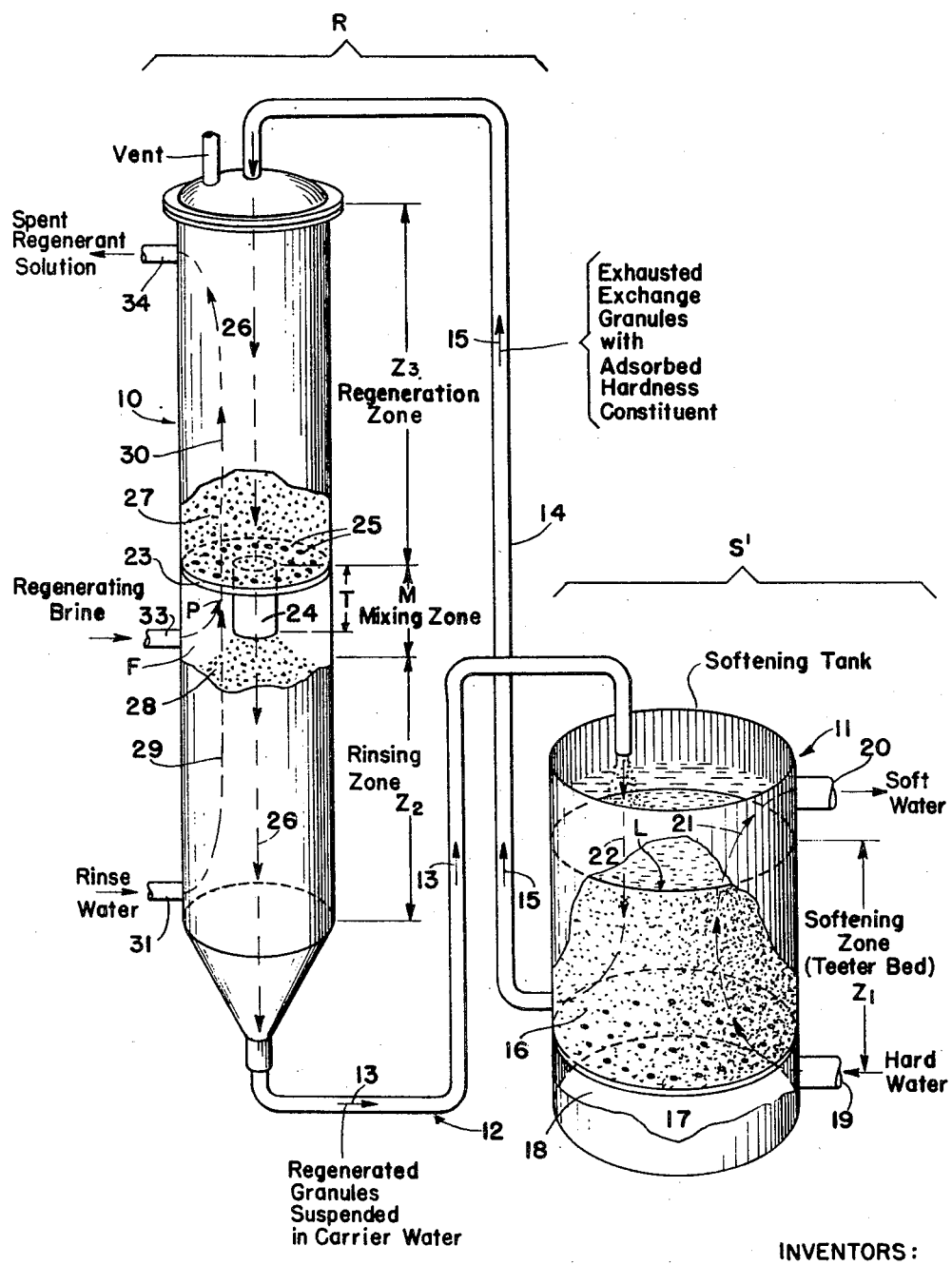
Fig. 1 is a diagrammatic view of the treatment system embodying the continuous treatment cycle operating through a regeneration tower and a water-softening tank.

The general arrangement of the continuously operating cyclic treatment system in Fig. 1 diagrammatically illustrates the general mode in which the continuous treatment cycle is conducted. This system comprises a regeneration section R and a water treatment or a softening section S'. In this system a regeneration tower 10 is functionally interconnected with a softening tank 11 for cyclic operation by a conduit 12 leading from the bottom or outlet end of the tower 10 to the top or inlet end of the tank 11 for passing regenerated and rinsed exchange material from the regeneration tower to the tank as is indicated by arrows 13. A conduit 14 leads from the bottom portion of the softening tank 11 to the top of the tower 10 for passing exhausted exchange material from the softening tank to the tower for regeneration as is indicated by arrows 15. The softening tank 11 contains a body or bed 16 of exchange material which is being continuously maintained in a hindered settling or semi-teetering condition by the upflow therethrough of water being softened. A liquid permeable partition or constriction plate 17 defines the bottom limit of this bed of softening exchange material against a raw water inlet chamber 18 underneath for which chamber a supply of raw or hard water is indicated by an inlet connection 19. The softening bed 16 is shown to have a tentative upper limit or top level L established due to the hindered settling condition of the material. The distance between the constriction plate 17 and the top level L therefore represents the depth of an active softening zone $Z_1$ herein also termed the exhaustion zone because in it the exchange material gradually becomes exhausted as it adsorbs from the raw water calcium in exchange for sodium released from the material into the water. This softening or exhaustion takes place continuously as water rises upwardly as against the descending movement of the exchange material.

Softened water thus rises generally speaking in countercurrent fashion with respect to the exchange material of the softening bed, that is from the bottom inlet 19 to top outlet 20 as indicated by the direction of arrows 21. At the same time as the exchange material descends through the zone $Z_1$ from the top to the bottom of the tank it becomes progressively exhausted and is eventually withdrawn just above the constriction plate 17 into and by the conduit 14 which carries it by means of carrier water to the top of tower 10 for regeneration, this transfer of exhausted material from the softening section S to the regeneration section R being indicated by the arrows 15. The downward movement of the exchange material through the softening zone is indicated by a line of arrows 22 pointing countercurrent to the arrows 21.

The regenerating tower 10 is functionally divided by a liquid permeable partition 23 into a rinsing zone $Z_2$ below and a regeneration zone $Z_3$ above the partition. The exhausted exchange material supplied to the top of the tower passes sequentially downwardly through these zones $Z_3$ and $Z_2$, being transferred from the upper to the lower zone by way of passage or downwardly directed spout 24, herein also termed a down spout, of a length T extending downwardly from the underside of partition 23. That is to say, the partition 23 provides upward passage therethrough of liquid from the rinsing zone $Z_2$ to the regeneration zone $Z_3$ by reason of small perforations 25 or the like, and it also provides passage for exchange material in the opposite direction, that is downwardly through the down spout 24.

The exhausted exchange material entering at the top passes downwardly through the tower in a continuous manner as indicated by downwardly pointing arrows 26, the material being supplied to the tower by conduit 14, and being withdrawn therefrom by way of conduit 12. The exchange material although in continuous downward transit through the tower 10 forms a bed of material 27 within the regeneration zone $Z_3$ which bed is supported by the partition 23, and it also forms another bed of material 28 within the rinsing zone $Z_2$ this bed being supported by the bottom of the tower. It is important to note that these beds 27 and 28 have interposed between them a space F surrounding the down spot 24 which space is free of the bulk of exchange material constituting bed 28, and which space will herein be designated as the mixing zone M for reasons presently to be explained.

At the same time there passes upwardly or countercurrently through the rinsing zone $Z_2$ a continuous flow of rinse water as indicated by arrows 29, while through the regeneration zone $Z_3$ there passes a continuous upward flow of regenerant solution such as brine indicated as by arrows 30.

The supply of rinse water to the zone $Z_3$ is indicated by an inlet connection 31. Spent rinse water emerging from the top of the rinsing bed 28 carries whatever residual brine it has washed from the exchange material in the process of rinsing and it therefore represents a weak brine. This spent rinse water emerging from the top of the rinsing bed into the mixing zone M mixes with fresh strong regenerant solution or brine being introduced into the mixing zone M as by a brine inlet connection 33.

The mixture of strong brine and spent rinse water (which is weak brine) represents regenerant solution of a suitable concentration to pass upwardly through the constriction plate 23 and countercurrently to the exchange material through the upper bed 27 as indicated by arrows 30. The mixing of spent rinse water with fresh strong brine is indicated by the junction of the flow arrows 29 with the line of flow arrows 30 as at P. Spent regenerant solution emerging from the top of bed 27 passes from the top portion of the tower 10 as indicated by an outlet connection 34, and may go to waste or be disposed of in any suitable manner.

Figure 2:
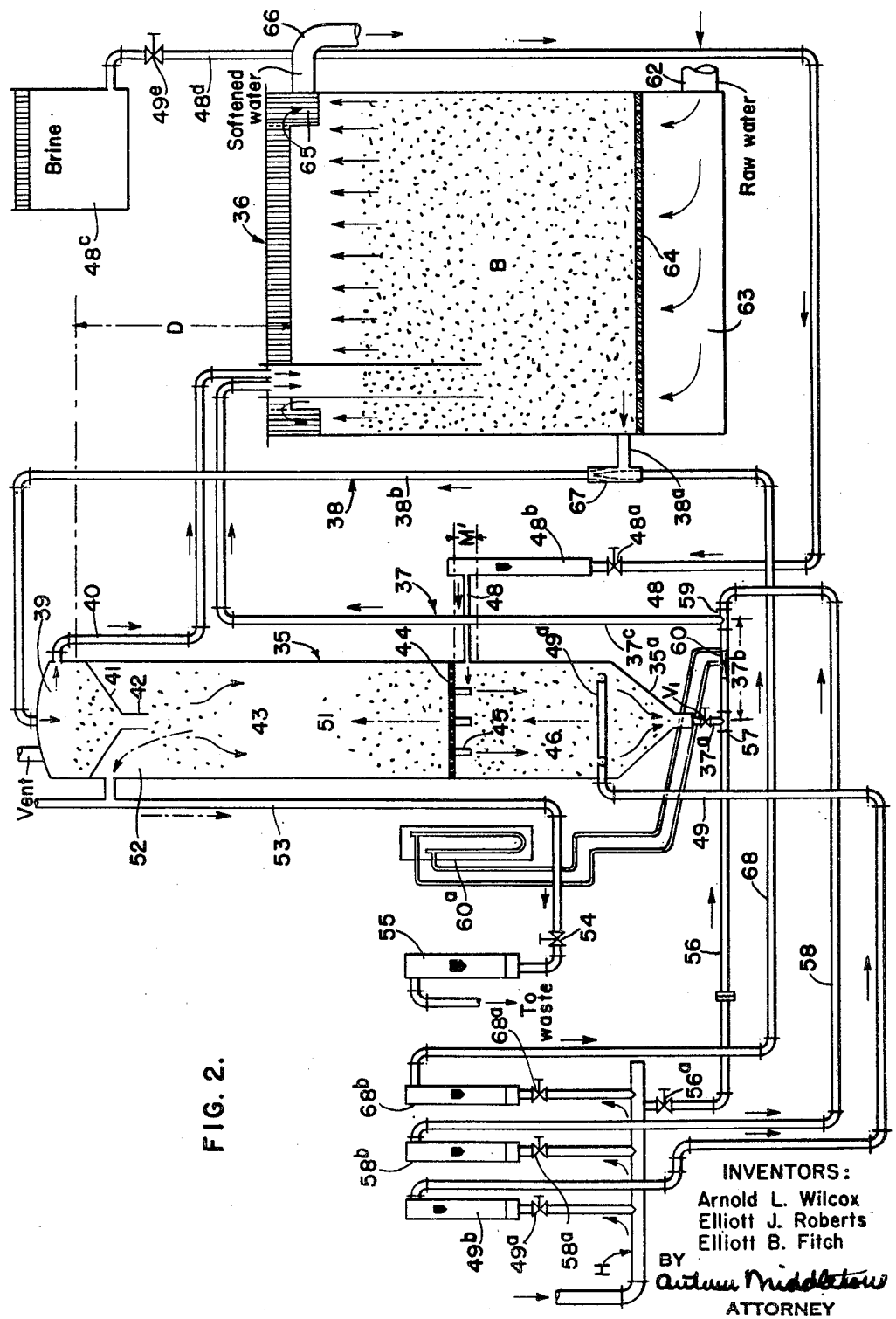
Fig. 2 shows the treatment system of Fig. 1 more fully implemented as to equipment, structure, and control devices, especially embodying the return of excess exhausted exchange material by overflow from the regeneration tower to the softening tank.

The diagrammatic treatment system of Fig. 1 is represented in Fig. 2 although more fully implemented by equipment, structure, and control devices.

In Fig. 2 a regeneration tower 35 corresponds to the tower 10, while a softening tank 36 corresponds to the tank 11 of Fig. 1. Similarly the conduit 12 of Fig. 1 is represented in Fig. 2 by a pipe 37 leading from the bottom end of the tower to the top end of the tank, which pipe comprises the vertical portion $37^a$ provided with valve $V_1$, the horizontal portion $37^b$, and the rising portion $37^c$. The conduit 14 leading from the bottom portion of the tank to the top of the tower in Fig. 1 is represented in Fig. 2 by a pipe 38 comprising a short horizontal portion $38^a$ and a rising portion $38^b$.

The tower 35 in addition comprises a feed reservoir or chamber 39 at the top which receives exhausted exchange material from tank 36 and has an overflow pipe 40 through which any exchange material excessively fed to this reservoir returns to the tank.

Figure 3:
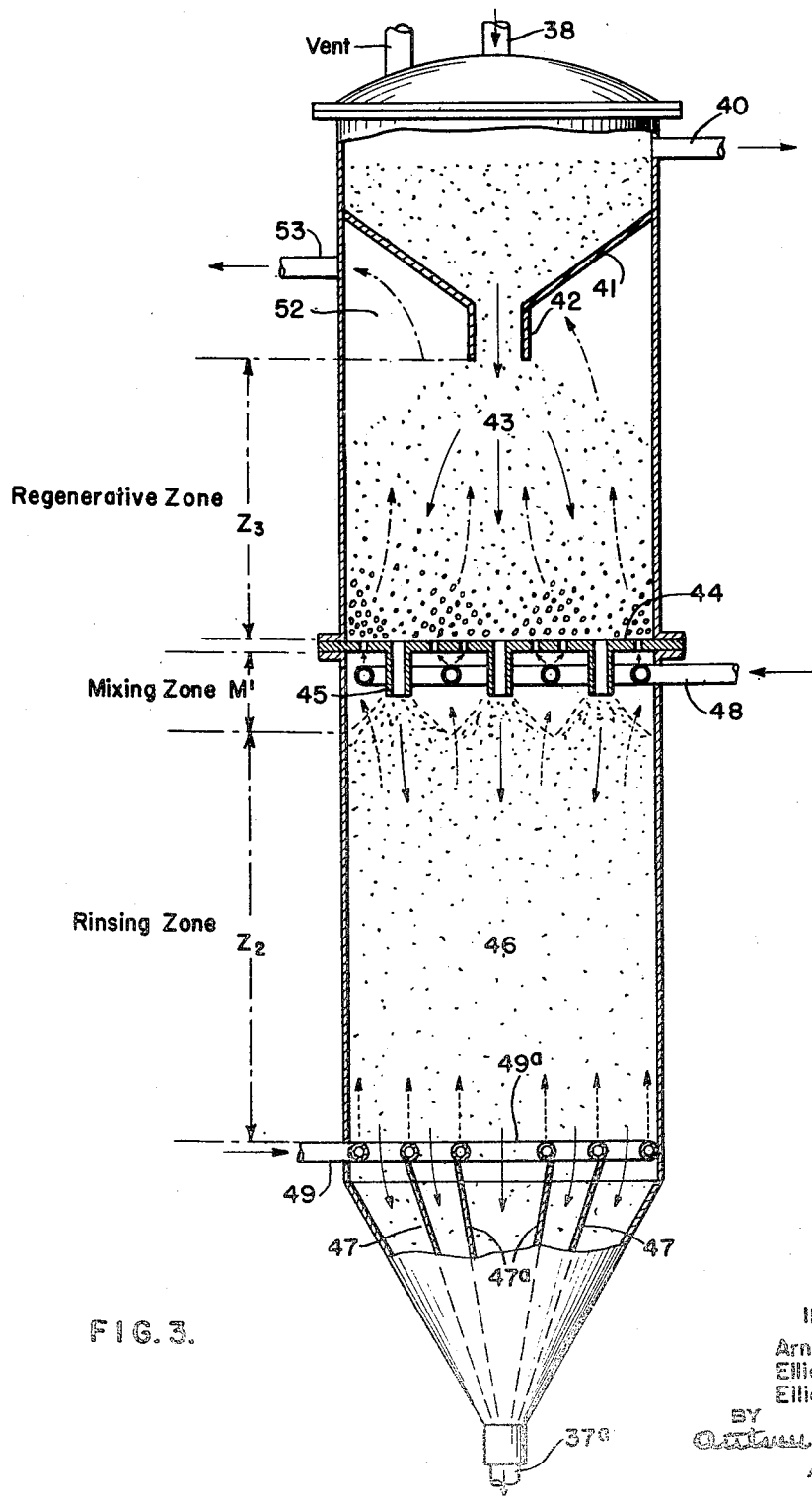
Fig. 3 is an enlarged detail view of the regeneration tower of Fig. 2.

The feed reservoir 39 has a hopper-shaped bottom 41 and an outlet neck or depending boot 42 through which it allows exchange material by gravity to supply and maintain a bed 43 of such material for regeneration. This bed 43 corresponds to the bed 27 or else to the regeneration zone $Z_3$ of Fig. 1, and is supported by a liquid-permeable partition 44 which corresponds to the partition 23 of Fig. 1, although provided with a plurality of down-spouts 45 through which regenerated material migrates downwardly by gravity to supply and maintain a bed 46 of regenerated material which corresponds to the bed 28 or else to the rinsing zone $Z_2$ of Fig. 1. This bed 46 is supported by the hopper-shaped bottom $35^a$ of the tower as well as by a number of inverted conical and concentric guide baffles 47 and $47^a$ more clearly shown in Figs. 3 and 4.

A mixing zone M' corresponding to the mixing zone M of Fig. 1 is interposed between the upper or regeneration bed 43 and the lower or rinsing bed 46, into which mixing zone M' there is introduced a supply of fresh regenerant solution or brine as by a brine supply pipe 48 which is provided with a control valve $48^a$ and with a flow-meter $48^b$. A brine reservoir $48^c$ feeds the brine supply pipe $48^d$ through a control valve $49^e$.

Rinse water is introduced into the bottom portion of the lower bed 46 as by a rinse water supply pipe 49 terminating in a distributing header $49^a$ within the bed. The rinse water pipe 49 receives its supply through a control valve $49^a$ and a flow-meter $49^b$ from a pressure water supply header H. Rinse water from this header H rises in the bed as is indicated by dotted line arrows. As the rinse water rises through this bed it becomes slightly enriched with salt due to residual brine adhering to the exchange material from its preceding regeneration treatment in the upper bed. Thus the rinse water as weak brine emerges from the lower bed and upon reaching the mixing zone M' meets and mixes with the strong brine supplied thereto. This mixture of spent rinse water, representing weak brine, with a fresh strong brine represents the regenerant solution which continues upwardly through the permeable partition 44 and into and through the upper bed 43 as is indictaed by dot and dash arrows 51. When spent in the course of passing upwardly through the upper bed, this solution as spent regenerant solution emerges from the top of the bed and into a collecting space 52 between the bed and the superjacent reservoir 39, whence the spent solution discharges as through discharge pipe 53 provided with a discharge control valve 54 and with a flow-meter 55.

The transfer to the softening tank 36 of regenerated and rinsed granular exchange material discharging from the bottom end of the tower 35 is effected by a supply of carrier- or control water through a pipe 56 provided with a control valve 56$^a$ and leading from the pressure water supply header into the transfer conduit 37 at a junction point 57. This represents what may herein be called the primary control water supply and its pressure may be such that the larger portion thereof serves to carry off the granules of exchange material discharging from the tower, while a small portion of this control water may surge upwardly into and through the bottom outlet of the tower to join the rinse water supply introduced into the lower portion of the rinsing zone. However, this pressure balance may vary within suitable limits so that all of the control water may act as carrier water, while a small portion of the rinse water may pass with the exchange material from the tower.

Leading from the supply header H is another control water supply pipe 58 carrying secondary control water into the transfer pipe 37 at a junction point 59. Interposed in the transfer pipe 37, namely between the junction points 57 and 59 is a Venturi flow-meter 60 provided with flow rate indicator 60$^a$. Furthermore there is provided at the effluent end of the transfer pipe 37 an effluent constriction or orifice 61 (see also the enlarged views thereof in Figs. 4 and 4$^a$) which represents an effluent flow resistance to the slurry of exchange material discharging therefrom into the softening tank. That orifice is so dimensioned that through it will pass only an effluent slurry volume not greater than a predetermined suitable maximum.

While the pressure of the primary control water in pipe 56 may be kept constant at a value to furnish sufficient diluent water for the slurry of exchange material discharging from the tower, it is by varying the pressure of the secondary control water in pipe 58 that the rate of discharge of regenerated exchange material from the tower, that is the rate of throughput of exchange material, may be varied and controlled. That is to say, the rate of throughput of exchange material is decreased by an increase of the pressure of the secondary control water, while a decrease of that pressure will increase the rate of throughput as will be explained in greater detail further below.

The softening tank 36 has at the bottom an inlet 62 for raw water to be softened, leading into a distributing chamber 63 whence the raw water flows upwardly through a liquid-permeable constriction plate 64 into a bed B of exchange material herein called the teeter bed since it is kept in teeter condition by a sufficiently high rate of upflow of the water. Softened water overflows into a launder 65 at the top of the tank whence it discharges through an outlet 66.

While softening takes place in this manner continuously in the teeter bed of the tank 36, exhausted or substantially exhausted exchange material is withdrawn from the bottom portion of the teeter bed by means of an ejector device 67 interposed in the pipe 38 and actuated by pressure water supplied from the header H through a supply pipe 68 provided with a control valve 68$^a$ and with a flow-meter 68$^b$.

Referring to Fig. 4 the inverted conical baffles 47 and 47$^a$ subdivide the hopper-shaped bottom portion of the tower 35 into three annular downwardly constricted channels $C_1$, $C_2$, and $C_3$ through which the regenerated and rinsed exchange material may reach the bottom outlet proper of the tower. The arrangement of these conical baffles is such as to encourage or induce uniformity of downward progress of the exchange material of the entire cross-sectional area of the tower, that area being the effective area of the beds 43 and 46.

In terms of diameters the channels $C_1$, $C_2$, and $C_3$ are defined by the top end diameter $d_1$ of baffle 47$^a$, top end diameter $d_2$ of baffle 47, and diameter $d_3$ of the tower. The disposition and dimensioning of the baffles 47 and 47$^a$ are such that the inlet areas of the channels $C_1$, $C_2$, and $C_3$ are proportional to their respective outlet areas as defined by diameters $d_1'$, $d_2'$, and $d_3'$. That is to say, the top end areas defined by differentials $(d_3-d_2)$, $(d_2-d_1)$, and the diameter $d_1$ are proportional to the bottom areas defined by the differentials $(d_3'-d_2')$, $(d_2'-d_1')$ and the diameter $d_1'$.

In Fig. 4 a header 69 for introducing rinse water into the bottom portion of the rinsing zone corresponds to the header 49$^a$ of Fig. 2. The header 69 being supplied by rinse water pipe 49 comprises a number of concentrically disposed annularly shaped pipe sections 49$^b$, 49$^c$, and 49$^d$ all interconnected as by radially extending pipe sections 49$^e$, 49$^f$, 49$^g$ and 49$^h$. The annular concentric pipe sections 49$^b$, 49$^c$, and 49$^d$ substantially register with diameters $d_1$, $d_2$, and $d_3$ respectively.

In the operation, raw water entering the open softening tank 36 through bottom inlet 62 is softened as it contacts the exchange material in the bed B as the bed is being teetered by the rate of upflow of the water. Treated or softened water overflows into the launder 65 to discharge.

Exchange material is continuously removed from the bottom portion of the teeter bed B by the ejector 67 which is actuated by the controlled supply thereto of metered pressure water from the supply header H. That is, the ejector 67 draws spent or substantially spent exchange material from the tank and impells and lifts it through the riser pipe 83 to the top of the regeneration tower 35 and into the reservoir 39 thereof. The ejector 67 is operated to supply a reasonable or slight excess of exchange material to the tower 35, such an excess being over and above what it is desired to have pass through and gravitationally discharge from the tower 35 at an adjusted rate. Thus any material excessively fed to the reservoir 39 of the tower is allowed to return or gravitate back to the tank 36 by overflow through the pipe 40.

In contrast with the teeter condition of the exchange material in the softening bed B, the material during its transit or gravitation through the tower 35 forms in both the regeneration as well as the rinsing zones $Z_3$ and $Z_2$ a bed of subsided even though downwardly migrating exchange material. That is, in these beds the upflow velocity of the liquids passing therethrough is insufficient to render them into a teeter condition. Therefore, the granules in these beds may be said to be in a subsided condition in which they more or less contact and support each other even though in downward transit. Such beds containing a body or bulk of subsided granular exchange material therefore have a certain void volume, that is the sum total of the spaces between the granules of the bed, which void volume of course is filled by the liquids passing through these beds.

The rate of migration of the exchange material, that is the rate of gravitation of the material through the tower 35 depends upon the rate at which it is being allowed to discharge from the bottom end of the tower. An accurate and sensitive control of discharge of the slurry of exchange material is effected hydraulically, namely by adjusting the pressure of the primary- and of the secondary control water in pipes 56 and 58 respectively. In other words, the control of these control water pressures represents a means of fine adjustment which can be effected by setting the control valve 56$^a$ and 58$^a$ respectively in view of the indications of corresponding flow meters 60$^a$ and 58$^b$. Such fine control can be effected by maintaining the valve $V_1$ and the control valve 56$^a$ at a fixed setting found to be suited for this operation, while the valve 58$^a$ controlling the supply of the secondary control water represents the variable which can be adjusted for either increasing or decreasing the flow rate and pressure of the secondary control water carried by pipe 58 into the transfer pipe 37$^c$. The result of that control is that corresponding more or less back pressure is exerted upon the slurry of exchange material discharging from a bed of the tower 35. Hence an increase in secondary control water pressure will correspondingly retard the rate of transit of exchange material through the tower, while a decrease of that control water pressure will decrease the rate of transit of the material in the tower. This control effect of the secondary control water is due to the presence of the effluent restraining or effluent choking orifice 61 provided at the discharge end of transfer pipe 37. The dimension of the effluent orifice 61 is such that it will allow to discharge the allowable maximum volume of slurry of exchange material into the softening tank, that is a volume corresponding to the maximum rate of passage of the material through the tower. Therefore, such allowable maximum quantity of exchange material would actually discharge through that orifice into the tank, if the supply of secondary control water through pipe 58 were shut off entirely. In that case only primary control water or carrier water would be utilized as a diluent for the slurry of exchange material discharging from the tower and it would be the carrier medium that transfers the material to the softening tank 36. By the same token as secondary control water is introduced or forced into the slurry transfer pipe 37 at the junction 59, the quantity of exchange material actually transferred is reduced.

The rate at which exchange material is pumped from the softening tank 36 to the top of tower 35 is controlled by throttling the pressure water supplied by pipe 68 to the ejector 67 in accordance with indications of the flow meter 68$^b$.

In the regeneration tower 35 there are to be distinguished three flows. One flow is that of the exchange material moving downwardly. The other two flows are those of the rinse water and of the regenerant solution flowing upwardly and countercurrently to the descending exchange material. The flow rates of all these flows through the tower are controlled and coordinated to one another by the setting of respective control valves in view of indications of the respective flow meters.

The rinse water under suitable pressure enters the bottom portion of the rinsing zone $Z_2$ so that part of that water is discharged from the bottom of the tower as void water together with the regenerated exchange material, while the major portion of the rinse water flows upwardly through the rinsing zone for the actual rinsing operation. Directly above the rinsing zone $Z_2$ although underneath the partition 44 the spent rinse water mixes with fresh brine introduced at this point under suitable pressure in the mixing zone M, the mixture constituting fresh regenerant solution.

This mixture or regenerant solution, because of the pressures of the rinse water and of the brine is forced upwardly through the liquid permeable portion of the partition 44 and on through the superjacent regeneration zone $Z_3$, countercurrently to the descending exchange material. Spent regenerant solution currently discharges from the space 52 directly underneath the reservoir 39 in the upper portion of the tower and passes off through discharge pipe 53 at a rate controlled by valve 54 in view of indications of flow-meter 55.

The rate of discharge from the tower of a slurry of regenerated exchange material, that is the rate of throughput of that material through the tower is controlled by the setting of valve $V_1$ as well as by adjustment of the rates of supply of the primary and of the secondary control water carried by pipes 56 and 58 respectively, in the manner above set forth.

Since the effective height of the column of liquid in the tower is greater than the effective height of the liquid column in the softening tank, there is a gravity flow of slurry of exchange material from the tower to the tank. However, the rate of such gravity transfer of slurry from tower to tank is limited by the orifice 61 provided at the discharge end of the transfer pipe 37. The rate of slurry transfer is controlled with the secondary control water in pipe 58 which is metered into the transfer pipe 37 at the junction point 59, that is between the Venturi meter 60 and the orifice 61, the flow of primary control water through pipe 56 being kept at a suitable constant baisc rate.

Since the total or maximum flow through the transfer pipe 37 is limited by the effluent orifice 61, any increase in the flow rate acts as a repressant upon the discharge of the exchange material from the tower and accordingly decreases the rate of discharge from that tower. That is to say, with no secondary control water at all being admitted into the transfer pipe 37 the transfer flow of material from tower to tank will be the maximum that is intrinsically permissible by the size of the orifice 61.

With the flow of primary control water kept at a constant rate, the amount of exchange material or slurry being transferred from tower to tank is measured by the pressure differential herein termed $\Delta P$ derived from the Venturi meter 60.

The upflow rate of the rinse water through the bed of exchange material in the rinsing zone must be such that the residual brine is displaced or washed from the voids of the descending exchange material before the material reaches the bottom of the rinsing zone. Yet the rinse water volume flowing upwardly should be a minimum considering that the fresh brine with which it is to mix should not become unduly diluted and its regeneration efficiency thereby reduced. Therefore, the rate of downward transit of the exchange material should be correlated to the upflow rate of the rinse water as well as to the upflow rate of the regenerant solution through the regeneration zone.

Still another factor affecting the choice of a suitable upflow rate of the rinse water under given conditions lies in the fact that the operation of the regeneration tower as herein proposed requires the introduction of a heavy solution (saturated brine) into a lighter phase (spent rinse water), with the lighter solution below and the heavier one above. Hence, the saturated brine being introduced above the rinsing-zone will tend to "plunge" into and through the body of lighter rinse liquid below and to some extent escape as salt leakage with the exchange material discharging from the tower.

The interior arrangement and the operation of the regeneration tower according to this invention counteracts or offsets this tendency of salt leakage without the expenditure of any undue amount of upflow rinse water. Due to the provision of the mixing zone M interposed between the rinsing zone and the regeneration zone, the saturated fresh brine being introduced into that interposed zone is free to mix with the rising rinse water so that the specific gravity of the brine is reduced before it has a chance to penetrate to any appreciable extent downwardly into the bed of exchange material being rinsed, and against the rinse water upflowing from the void spaces of the rinsing bed, so to speak, in innumerable small streams.

Indeed, in view of what we have observed we consider the top or surface of the rinsing bed as presenting something like a barrier to any potential downward salt leakage through the rinsing bed. In effect the top of this bed might be compared to a constriction plate where the voids of the bed correspond to the holes in such a plate. Interpreting such a comparison further, it might then be said that with an upward flow of rinse water through the many holes there cannot be a downflow at the same time. Thus the flow velocity of the innumerable small upward rinse water streams bars downward flow of regenerant solution and they sustain the heavier solution on top even at a practical minimum expenditure of rinse water.

We further aid the elimination of and discourage salt leakage by discouraging any tendency of the descending exchange material in the rinsing section to short circuit towards the constricted bottom outlet of the tower and we discourage such short-circuiting by the provision of the conical outlet baffles 47 and 47ᵃ.

The partition 44 dividing the rinsing zone $Z_2$ through the regeneration zone $Z_3$ allows for upward passage therethrough of liquid by reason of a uniform pattern of small drilled holes in the partition. Provision is made in this partition for concurrent downward passage therethrough of the exchange material, namely through the down-spouts 45. These down-spouts also are arranged in a uniform pattern of distribution over the cross-sectional area of the tower, that is in such a manner that the rate of downward movement of the material in the regeneration bed is substantially uniform over the cross-sectional area. The spacing of the down-spouts from one another is such that only a reasonably small stagnating volume of exchange material remains between them on top of the partition. Otherwise the number of down-spouts and their diameter are chosen to meet hydraulic requirements, the diameter of the down-spouts in particular being large enough to avoid their being plugged up by the exchange material, and at the same time not so large as to counteract the hydraulic requirements for establishing desired flow and operating conditions in the tower.

Also the diameter as well as the length of the down-spouts is determined or chosen in view of whatever upward flow resistance is offered by the liquid permeable portion (drilled holes) of the partition. That is to say, a loss of hydraulic head is incurred by the flow of the liquid (regenerant solution) upwardly through the small holes in the partition, but it is desired that the bulk of this liquid should flow through these holes rather than through the cross-sectional areas of the down-spouts which spouts may have a diameter many times that of the small holes. Of course, the diameters of all the small holes in the partition are substantially alike and so are the larger diameters of the down-spouts. In the operation of the regeneration tower the granules of exchange material passing through the down-spouts while in a subsided condition have regenerant solution entrained between them, so that their downward migration tends to transport or draw entrained regenerant solution downwardly through these spouts from the regeneration zone into the rinsing zone. In order that such downward transfer of solution be minimized, the length of the down-spouts is so chosen that the hydraulic head produced by this downward drawing or pumping effect upon the solution is substantially equal to the loss in head across the partition, that is the head loss encountered by the liquid passing upwardly through the partition. In this way an approximate hydraulic balance may be established across the down-spouts, that is between the upper and the lower ends of these spouts so that the downward transfer of solution through these spouts may be minimized.

When excess exchange material returns by overflow from the reservoir 39 to the softening tank, the water carrying the returning material should not be contaminated by regenerant solution leaking upwardly through the neck 42 from the regeneration zone below. Therefore, the rate of upflow of regenerant solution through the regeneration zone $Z_3$ and the rate of inflow of carrier water into the reservoir 39 should be so adjusted or balanced with respect to each other that there will result a small net downflow of water from the settling zone in the reservoir 39 into the space 52 below and thence into the outlet pipe 53 for spent regenerant solution. By causing the exchange material settling in the reservoir 39 to reach the subjacent regeneration zone through a constricted passage as represented by the neck 42, a suitable downward velocity of exchange material and entrained water is obtained which discourages or bars the upward percolation of spent regenerant solution into the reservoir. At the same time a greater hydraulic resistance is presented as against excess flow of water from the reservoir into the regeneration zone. In this way one may operate with a positive head for downward percolation of water through the neck 42, yet without losing into the spent regenerant solution any substantial amount of carrier water used to lift the exchange material from the softening tank to the top of the tower.

The exhausted granular exchange material supplied by carrier water to the top of the tower is allowed to settle in the reservoir 39, the settling material in effect being supported through the neck 42 by the subjacent bed of exchange material in the regeneration zone Z₃, the settled material in that zone in turn being similarly supported through material in the down spouts 45 by the settled material constituting a bed in the rinsing zone Z₂ which latter bed in turn is supported by the bottom of the tower. That is to say, there is a continuity of exchange material in settled or subsided condition extending from the top- to the bottom portion of the tower through the various zones, although submerged in the respective liquids. The material in such continuity and continually submerged will migrate downwardly through the tower from one zone to the next at the controlled rate at which regenerated and rinsed material is being released from the tower.

Fig. 6 shows in another embodiment what is in effect a mixing zone disposed outside the tower. Accordingly there is provided a partition 70 dividing a tower T into a rinsing zone Z₅ below and a regeneration zone Z₆ above the partition, each of these zones being represented by a bed of exchange material in downward transit. This partition has down-spouts 71 for downward transfer therethrough of regenerated exchange material, that is from the regeneration zone into the rinsing zone. In distinction from the Figs. 1 and 2 embodiment this partition has no upward permeability for liquid. Rather, spent rinse water emerging from the rinsing zone Z₅ into a space or collecting zone Z₄ underneath the partition is drawn off by a pump P through a pipe 72 and reintroduced through a pipe 73 into the tower although at a point directly above the partition and thus into the bottom portion of the regeneration zone Z₆. A control valve 74 and a flow meter 75 are interposed in pipe 73. Fresh brine to mix with the withdrawn spent rinse water and supplied under pressure by a pipe 76 through a control valve 77 and a flow-meter 78, is introduced into pipe 73 where it mixes with the spent rinse water prior to entering the regeneration zone Z₆.

The diagrammatic view in Fig. 7 of an installation embodying this invention illustrates the fact that the arrangement of certain equipment through which the operating cycle functions, can be modified without departing from the spirit of this invention.

In this embodiment an open softening tank 79 is disposed above a regeneration tower 80 and has direct hydraulic communication therewith through a conduit 81 leading into the otherwise closed top of the tower. The tower operates with respect to regeneration and rinsing in a manner similar to that in which the Fig. 1 to 5 embodiment of the tower operates. That is to say, the tower is divided by a two-way constriction plate 82 into a regeneration zone Z₇ above and a rinsing zone Z₈ below, and there is an interposed mixing zone M'' between these two zones and underneath the constriction plate. The constriction plate itself may be similar to that in the Figs. 1 to 5 embodiment insofar as it provides upward and downward passage along different paths for the upflowing regenerant solution and for the descending exchange material respectively.

Rinse water is metered into the rinsing zone Z₈ as by a pipe 83 leading through flow-meter 84 from a supply heater H'. Strong regenerant solution enters the mixing zone M'' through a pipe 84ᵃ by way of a flow-meter 85, the strong solution or brine being supplied by a pump 86 from a brine supply tank 87 which receives salt from a rock salt storage bin, indicated at 88.

Regenerated and rinsed exchange material is released from the bottom end of the tower 80 at a controlled rate and is lifted through a riser pipe 89 by means of an ejector 90 to supply the softening tank 79 above, the pipe 89 leading into a feedwell 91 in the softening tank. Again as in the Fig. 2 embodiment there is interposed in the riser pipe 89 a Venturi meter 92 provided with a flow indicator 93.

Control water derived from the common supply header H' flows through a flow-meter 94 in a pipe 95 into pipe 89 at a point 96, the point 96 being located between the outlet end of the tower and the Venturi meter 92. Pressure water for actuating the ejector 90 is supplied through a pipe 97 also from the common supply header H'. With a suitable fixed quantity of control water entering the pipe 89 at a point 96 through a control valve 96ᵃ, the Venturi meter 92 meters the quantity of slurry being discharged from the tower while the rate of discharge can be controlled by varying the supply of pressure water to the ejector 90 in pipe 89 by means of a valve 98.

Spent regenerant solution leaves the top of tower 80 by way of a discharge pipe 99 to waste, a control valve 100 being provided in this discharge pipe.

The softening tank 79 is shown to be supplied with raw water through a pipe 101 having a control valve 102 and a flow metering orifice 103 with flow rate indicator 104. Softened water overflows from the tank through a discharge pipe 105.

We claim:

1. The method of ion exchange treatment of a liquid by contact with a granular ion exchange material in which the material passes cyclically and repetitiously downwardly through a series of treatment zones, namely, an exhaustion zone, a regeneration zone, and a rinsing zone, with a material in said regeneration zone and said rinsing zone being in a state of subsidence, while respective treating liquids, namely, the exhausting liquid, the regenerant liquid, and the rinse water pass countercurrently and continuously through the respective treatment zones; characterized by the fact that a mixing zone is maintained functionally interposed between the rinsing zone and the regeneration zone and substantially free from any of the exchange material in transit through the zones, that fresh regenerant chemical is continuously added to spent rinse water in said mixing zone to produce fresh regenerant solution, and that this regenerant solution is passed upwardly through the regeneration zone and discharged as spent regenerant solution from the top end thereof.

2. The method of regenerating exhausted granular ion exchange material in a continuous manner in which the material passes continuously downwardly through a regeneration zone and then through a rinsing zone while a body of such material subsided and submerged is continually present in each zone although in continuous transit sequentially through said zones, and in which rinse water passes continuously upflow through the rinsing zone countercurrently to the direction of migration of the exchange material therethrough so that the rinse water becomes enriched with regenerant chemical washed from the material; characterized by the fact that a mixing zone is maintained functionally interposed between the rinsing zone and the regeneration zone and substantially free from any of the exchange material in transit through the zones, that fresh regenerant chemical is continuously added to spent rinse water in said mixing zone to produce fresh regenerant solution, and that this regenerant solution is passed upwardly through the regeneration zone and discharged as spent regenerant solution from the top end thereof.

3. Apparatus for ion exchange treatment of a liquid by contact with a granular ion exchange material in which the material passes cyclically and repetitiously through a series of treatment zones namely an exhaustion zone, a regeneration zone, and a rinsing zone, comprising a regeneration tower providing in its upper portion the regeneration zone and in its lower portion the rinsing zone, a two-way permeable partition functionally dividing said zones and comprising a constriction plate supporting the exchange material of the regeneration zone and providing upward transit therethrough of regenerant solution, and down-spouts providing downward transit of regenerated exchange material into said rinsing zone, the length of said down-spouts providing at the underside of said partition a mixing zone free from bulk exchange material for mixing spent rinse water representing weak regenerant solution with fresh strong regenerant solution to make up fresh regenerant solution adapted to pass upwardly through said constriction plate into the regeneration zone, feeding means for introducing rinse water at the bottom of the rinsing zone, feeding means for introducing strong regenerant solution into said mixing zone, discharge means for passing spent regenerant solution from the top end of the regeneration zone, means for discharging regenerated and rinsed exchange material at a controlled rate from the bottom of said rinsing zone while restraining the discharge of rinse water, a reservoir at the top of said tower for spent regenerant material and having communication with the top of the regeneration zone for passing thereto exhausted exchange material gravitationally and substantially at the rate of withdrawal of regenerated material from the bottom of the rinsing zone, said reservoir having overflow means for passing therefrom exchange material excessively fed thereto, a softening tank containing the exhaustion zone of the exchange material, means for passing exchange material overflowing from said reservoir to said tank, transfer conduit means for passing regenerated and rinsed exchange material from the discharge of the rinsing zone to said tank, control means for adjusting the rate of transfer of said exchange material from the rinsing zone to the softening tank, means for passing substantially exhausted exchange material from said tank to said reservoir, the point of feed of regenerated exchange material to the tank being functionally spaced from the point of withdrawal therefrom of more exhausted exchange material, feeding means for introducing exhausting solution into the tank, discharge means functionally spaced from said last-mentioned feeding means for passing ion exchange treated solution from said tank.

4. Apparatus according to claim 3, in which control means comprise a controllable supply of carrier water leading into said transfer conduit means, and flow-restricting means associated with said conduit and disposed downflow from said supply of carrier water for restricting the effluent of water carried exchange material into said tank.

5. Apparatus for regenerating exhausted granular ion exchange material comprising a regeneration tower providing in its upper portion a regeneration zone and in its lower portion a rinsing zone, a two-way permeable partition functionally dividing said zones and comprising a constriction plate supporting a bed of settled exchange material thereon and providing upward transit therethrough of regenerant solution, and down-spouts providing downward transit of regenerated material from the regeneration zone into the rinsing zone, the length of said down-spouts providing at the underside of said plate a mixing zone free from bulk exchange material for mixing spent rinse water representing weak regenerant solution with strong regenerant solution to make up fresh regenerant solution adapted to pass upwardly through said plate into the regeneration zone, feeding means for introducing rinse water at the bottom of the rinsing zone, feeding means for introducing strong regenerant solution into said mixing zones, discharge means for passing spent regenerant solution from the top end of the regeneration zone, means for discharging regenerated and rinsed exchange material from the bottom of said rinsing zone at a controlled rate while restraining the discharge of rinse water, and means for feeding spent regenerant material to the top of the regeneration zone whereby material fed to the top of the tower passes in settled condition gravitationally through the regeneration zone and then through the rinsing zone for gravitational discharge at the bottom thereof.

6. Apparatus according to claim 5, in which the top end of the tower constitutes a reservoir for receiving water-carried exhausted exchange material to settle therein, said reservoir having a bottom provided with a relatively constricted outlet for downward passage therethrough of settled exchange material into the regeneration zone, said bottom forming with the subjacent bed of settled exchange material a space in which spent regenerant solution is collected and from which it is discharged.

7. Apparatus according to claim 5, in which the means for discharging regenerated and rinsed exchange material comprise a discharge conduit leading from the bottom of the tower, said conduit having effluent constriction, throttling means upstream from said constriction, and means for introducing at a controlled rate pressure water into said conduit between said throttling means and said effluent constriction.

8. Apparatus for ion exchange treatment of a liquid by contact with a granular ion exchange material in which the material passes cyclically and repetitiously through a series of treatment zones namely an exhaustion zone, a regeneration zone, and a rinsing zone, comprising a regeneration tower having a closed top and providing in its upper portion the regeneration zone and in its lower portion the rinsing zone, a two-way permeable partition functionally dividing said zones and comprising a constriction plate supporting the exchange material of the regeneration zone and providing upward transit therethrough of regenerant solution, and down-spouts providing downward transit of regenerated exchange material into said rinsing zone, the length of said down-spouts providing at the underside of said partition a mixing zone free from bulk exchange material for mixing spent rinse water representing weak regenerant solution with fresh strong regenerant solution to make up fresh regenerant solution adapted to pass upwardly through said constriction plate into the regeneration zone, feeding means for introducing rinse water at the bottom of the rinsing zone, feeding means for introducing strong regenerant solution into said mixing zone, discharge means for passing spent regenerant solution from the top end of the regeneration zone, means for discharging regenerated and rinsed exchange material at a controlled rate from the bottom of said rinsing zone while restraining the discharge of rinse water, a softening tank containing the exhaustion zone and disposed above the regeneration tower, conduit means comprising a jet device for lifting regenerated exchange material discharging from the bottom of the tower to feed said softening tank, a discharge conduit means leading from the softening tank to and through the otherwise closed top of the tower for a gravitational passing of exhausted exchange material from said tank to the regeneration zone in said tower, means for feeding raw water to said tank, and means for discharging softened water from said tank.

ARNOLD L. WILCOX.
ELLIOTT J. ROBERTS.
ELLIOTT B. FITCH.

REFERENCES CITED

The following references are of record in the file of this patent:

UNITED STATES PATENTS

| Number | Name | Date |
|---|---|---|
| 1,671,864 | Higgins | May 29, 1928 |
| 1,707,302 | Godsey | Apr. 2, 1929 |
| 1,740,199 | Nordell | Dec. 17, 1929 |
| 1,770,580 | Neumann | July 15, 1930 |